Patented Oct. 23, 1934

1,978,197

UNITED STATES PATENT OFFICE 1,978,197

MANUFACTURE AND APPLICATION OF SPECIAL PIGMENTS SUITED FOR THE COLORING OF RUBBER

Anthony James Hailwood, William Johnson Smith Naunton, and Arnold Shepherdson, Manchester, England, assignors to Imperial Chemical Industries Limited, London, England No Drawing. Application September 27, 1928, Serial No. 308,874. In Great Britain October 21, 1927

9 Claims. (Cl. 134—58.5)

This invention relates to the manufacture of pigments for the coloring of rubber and their application to that purpose.

The coloring of rubber presents special problems owing to the nature of the processes the rubber mix must undergo subsequent to the addition of the pigment. In the case of so-called cold cured rubber the coloring matter must usually be resistant to sulphur chloride and in the normal hot vulcanization process it must be resistant to heat and the various chemicals incorporated in the rubber. Further, in order that the colored rubber may not mark off or "bleed" the coloring matters used must be of an insoluble nature. Many classes of coloring matters have been utilized for rubber coloration but the coloring matters fulfilling generally the above requirements in the highest degree are those belonging to the class of vat dyes which, moreover, have the further desirable attribute of great fastness to light.

Attempts have been previously made to apply vat colors to the coloring of rubber by directly adding such vat colors to the rubber mix during milling. However, the results were not satisfactory. Vat colors when applied to rubber in this manner do not have the expected tinctorial power and to produce a sufficiently colored rubber rather large amounts are necessary. As vat dyes are relatively expensive this makes the operation unduly costly. Further, in any event there is difficulty in uniformly incorporating vat colors into a rubber mix. The vat colors must be in a very finely divided form to give the best results and though vat dyestuffs may be prepared in the required finely divided condition by certain means, they do not remain long in this state, there being a strong tendency for the particles to agglomerate. This happens especially during the incorporating into the rubber mix; thereby increasing the milling time; the time required to eliminate the deeply colored streaks produced when the dye is first added to the rubber mix.

We have now found a new process of producing colored rubber by means of vat colors which is free from the noted disadvantages. In our present process of producing colored rubber, we first prepare a vat dye-pigment. This vat dye-pigment comprises a suitable finely divided substratum coated with the desired vat dye. The substratum may be any finely divided substance which is colorless or a pale color and which can be incorporated in rubber without detriment. In fact it is possible to use certain finely divided substances which of themselves are advantageous ingredients in a rubber mix. For instance filler materials such as barytes, alumina, whiting, clays, silica, kaolin, talc, asbestos, magnesium carbonate, lithopone, zinc white, etc., are suitable as substratum materials. A composite vat dye-pigment may be prepared by several methods. In all these methods however the vat dye is in a very finely divided state when it is mixed or contacted with the finely divided substratum. The vat dye becomes adsorbed or attached to the finely divided substratum, coating the same. In this way the vat dye is maintained in its extremely finely divided state and loses the tendency to become agglomerated. The vat dye-pigment possesses great tinctorial power and is easily and uniformly incorporated into the rubber, producing a very satisfactory colored rubber.

The coating may be carried out in various ways. An alkaline solution or suspension of the leuco compound of the vat dye may be prepared and the finely divided substance brought in contact with the dye vat so that the leuco compound surrounds the particles of the substance. The leuco compound is then oxidized by passage of a current of air or in other suitable manner and the vat dyestuff is thus precipitated in or on the particles of the substance. In this process it may be advantageous to carry out the oxidation in the presence of a protective colloid. Alternatively, a dispersed paste or suspension of the vat dyestuff may be brought into intimate contact with the finely divided substance and the latter thus becomes coated with the vat dyestuff. The dispersion of the vat dyestuff and the coating of the finely divided substance may proceed together by a grinding or comminution process such as is described in co-pending application No. 268,796, now Patent No. 1,837,772, by Hailwood and Shepherdson.

Further, we have found that many vat dyes are adsorbed on a suitable filler by merely boiling or stirring together the filler and a suspension of the die in a suitable medium, i. e. a medium which exerts a small but definite solvent action on the dye. Thus, we find that dimethoxydibenzanthrone when boiled with light magnesium carbonate in toluene suspension imparts to the filler a brilliant green shade of considerable depth.

In all the above ways our new special vat dye-pigment preparations are obtained which may be applied to the coloring of rubber by admixture during the milling or other mixing operation of the rubber compounds. The pigment preparations may be marketed and applied as aqueous pastes or as dry powders and may or may not contain other admixed chemicals advantageously added to rubber.

When the pigment preparations are produced as powders a fine grinding operation subsequent to drying may be required to enable them to disperse readily in the rubber mass. The fine grinding may, however, be eliminated by the addition of certain agents which aid re-dispersion and which form the subject of a separate application. A great advantage of our invention lies in the increased tinctorial value obtained, and the hitherto costly vat dyestuffs are rendered available for the coloring of rubber at a price commensurate with the value of the colored articles. A further advantage of our invention lies in enhanced speed and ease of incorporation in the rubber mix whereby the valuable natural properties of the caoutchouc are retained. It must be understood that in the term rubber we include balata, gutta percha, and analogous vegetable resins. The rubber may also be partly replaced by cellulose, celluose esters or other cellulosic compounds.

Our invention is illustrated, but not limited, by the following examples, in which the parts are by weight:

*Example 1.*—1000 parts of a finely dispersed Duranthrene blue (Color index 1106) suspension in water containing 50 parts of the pure dyestuff are mixed with 200 parts of china clay suitable for use as a rubber filler and itself in a fine state of division. The dyestuff itself may be brought into the required form by any suitable method. After stirring for some time to ensure uniformity of mixing and of adsorption, the product is filtered and dried. The dry powder is of a very bright blue color and is immediately ready for use as a rubber pigment.

In cases where the dispersion of the dystuff or pigment has been brought about by the use of a protective colloid, it may be found advantageous to assist the adsorption of the color by the addition of small quantities of a suitable precipitant; for example, electrolytes such as barium chloride. With such an addition the filter cake can be washed with water without material loss of dyestuff.

*Example 2.*—4000 parts of a ½ per cent solution of the leuco compound of the dimethoxydibenzanthrone known as Caledon jade green (Color index 1101), in dilute aqueous caustic soda solution, are stirred at 50° C. with 180 parts of light magnesium carbonate and the mixture air-blown until the dyestuff is completely precipitated. The product is filtered and washed with water. The filter cake is dried and powdered and is ready for use in rubber.

*Example 3.*—20 parts of the violet dye obtained by anisoylation of 4:8-diaminoanthrarufin are mixed with 140 parts of light magnesium carbonate and the whole is boiled under reflux with 1000 parts of benzene until a filtered and dried sample of the powder shows that the desired shade has been attained. The benzene is then removed, e. g. by filtration, and the residue is dried and ground for use as a rubber pigment.

*Example 4.*—This example illustrates the use of a combination of methods. 1000 parts of a 4 per cent aqueous suspension of Caledon jade green (Color index No. 1101) are stirred with 260 parts of light magnesium carbonate until adsorption of the color is substantially complete. The product is filtered, dried and powdered, and then boiled for a short time with 1500 parts of toluene. After filtration and drying, a pigment of very great brilliance and tinctorial power is obtained.

What we claim and desire to secure by Letters Patent is:—

1. In a process of preparing vat dye-pigments suitable for manufacturing colored rubber, the step which comprises mixing an insoluble vat dye in dispersed form with a suitable finely divided substratum in the presence of a liquid medium which exerts a definite, small solvent action on said vat dye, agitating the mixture thus produced until said insoluble vat dye is adsorbed by and coats said finely divided substratum, removing said liquid medium and recovering a composite unitary vat dye-pigment.

2. The process of claim 1 in which the said liquid medium is a hydrocarbon of the benzene series.

3. In a process of preparing vat dye-pigments suitable for manufacturing colored rubber, the step which comprises mixing the vat dye obtained by anisoylation of 4:8-diaminoanthrarufin with finely divided magnesium carbonate in the presence of benzene, boiling the mixture thus obtained under reflux until the said vat dye is adsorbed by and coats the said magnesium carbonate, removing the benzene and recovering a composite unitary insoluble vat dye-pigment.

4. In a process of preparing vat dye-pigments suitable for manufacturing colored rubber, the step which comprises boiling dimethoxy-dibenzanthrone with light magnesium carbonate in a toluene suspension.

5. The process of claim 1, in which the liquid medium is an organic liquid.

6. The process of claim 1, in which the dyestuff is Duranthrene blue.

7. The process of claim 1, in which the dyestuff is dimethoxy-dibenzanthrone.

8. The process of claim 1, in which the dyestuff is the vat dye obtainable by anisoylation of 4:8-diaminoanthrarufin.

9. The process of adsorbing a vat dyestuff unto the surface of a pale or colorless substratum whereby to produce a pigment, which comprises boiling together the vat dyestuff and substratum in a benzenoid hydrocarbon.

ANTHONY JAMES HAILWOOD.
WILLIAM JOHNSON SMITH NAUNTON.
ARNOLD SHEPHERDSON.